(12) United States Patent
Bayer et al.

(10) Patent No.: US 6,226,194 B1
(45) Date of Patent: May 1, 2001

(54) DC/DC CONVERTER

(75) Inventors: Erich Bayer, Thonhausen; Hans Schmeller, Falkenberg, both of (DE)

(73) Assignee: Texas Instruments Deutschland, GmbH (DE)

( * ) Notice: Subject to any disclaimer, the term of this patent is extended or adjusted under 35 U.S.C. 154(b) by 0 days.

(21) Appl. No.: 09/595,302

(22) Filed: Jun. 15, 2000

(30) Foreign Application Priority Data

Jun. 21, 1999 (DE) .............................. 199 28 309

(51) Int. Cl.$^7$ .............................. H02M 3/18; H02M 7/00
(52) U.S. Cl. .............................. 363/60; 307/110
(58) Field of Search .................. 363/59, 60; 307/109, 307/110

(56) References Cited

U.S. PATENT DOCUMENTS

| | | | |
|---|---|---|---|
| 5,262,934 | * 11/1993 | Price | 363/60 |
| 5,493,543 | * 2/1996 | Kamens | 363/60 |
| 5,757,632 | * 5/1998 | Beppu et al. | 363/60 |
| 5,790,393 | * 8/1998 | Fotouhi | 363/60 |

* cited by examiner

*Primary Examiner*—Peter S. Wong
*Assistant Examiner*—Bao Q. Vu
(74) *Attorney, Agent, or Firm*—William B. Kempler; Frederick J. Telecky, Jr.

(57) ABSTRACT

The invention relates to a DC/DC converter operating on the principle of a charge pump and comprising a first capacitor C1 alternatingly charged via four MOSFETs M1–M4 to the input voltage and then discharged in series with the input voltage via a second capacitor C2 connected to the output of the circuit. To set the starting current for charging the as yet empty capacitors to a precisely defined small value a switchable current mirror M3, M5 is used comprising one of the four MOSFETs (M3) and a further small MOSFET (M5) which is connected to a current source 4. A comparator 5 handles selection between the starting phase and the normal charge pump mode by comparing the output voltage $V_{out}$ of the converter to a reference voltage $V_{ref}$, it switching the current mirror and—via two small switches S2 and S3 connected to the gates of two of the four MOSFETs—also two of the four MOSFETs so that the capacitors may be charged in an energy-saving way. As compared to existing more complicated achievements this novel DC/DC converter is producable integrated on a smaller circuit area, it in addition to this taking into account the short-circuit case of the converter. In one special embodiment a foldback effect is achievable via a further MOSFET connected in parallel to the current source, the gate of this MOSFET being connected to the output of the converter.

20 Claims, 3 Drawing Sheets

DC/DC CONVERTER

The invention relates to a DC/DC converter operating on the principle of a charge pump, comprising a first capacitor, the one electrode of which is connectable via a first MOSFET to the input of the converter and via a second MOSFET to ground and the other electrode of which is connectable via a third MOSFET to the input of the converter and via a fourth MOSFET to the output of the converter, a second capacitor connected between the output of the converter and ground, and a control circuit with an oscillator connected to the gates of the four MOSFETs and serving with the charge pump active to signal the second and third MOSFET ON in the charging phase of the charge pump and the first and fourth MOSFET ON in the discharge phase of the charge pump.

Many electronic circuits require in addition to the supply voltage further voltages sometimes at a level above that of the supply voltage. One low-cost, simple and compared to converters employing an inductor highly compact solution for making these further voltages available are voltage converters operating on the charge pump principle. Converters of this kind are described e.g. in the text book "The Art of Electronics" by Paul Horowitz, 2nd edition, Cambridge University Press, New York, 1991 on pages 377 to 379 thereof.

Horowitz also describes a simple DC/DC converter operating on the charge pump principle with which an output voltage is achievable corresponding roughly to twice the input voltage at the most. The basic circuit of the converter consists substantially of a capacitor and four controllable switches (e.g. MOSFETs), whereby one electrode of the capacitor is connectable via a first switch to the input voltage terminal of the converter and via the second switch to ground, and the other electrode of the capacitor is connectable via the third switch to the input voltage terminal and via the fourth switch to the output voltage terminal of the converter. The converter comprises further a clock oscillator which signals the switch so that in a first phase of a clock cycle, the charge phase, the second switch and the third switch are ON whilst the other switches are OFF so that the capacitor is charged to the input voltage, and in a second phase of a clock cycle, the discharge phase, the first switch and the fourth switch are ON whilst the other switches are OFF so that the charged capacitor is then connected in series to the input voltage, resulting in a voltage value at the smoothing capacitor located at the output of the circuit corresponding to roughly twice the input voltage. In actual practice the converter is regulated by a regulator mechanism to a fixed output voltage level between that of the input voltage and twice thereof depending on the requirements of the particular application.

Since DC/DC converters operating on the charge pump principle often need to be accommodated as an integrated circuit in miniature portable devices, e.g. cellular telephones, powered by a battery or storage battery, the intention in such applications is to produce the converter firstly as small as possible, i.e. taking up as little circuit area as possible, and secondly to maintain the power consumption of the converter as low as possible to relieve the load on the battery or storage battery.

One problem fundamental in this context is the starting phase of the DC/DC converter since in this case the converter draws a particularly high current from the input of the converter to charge not only the, as yet, empty capacitor of the charge pump but also the smoothing capacitor, likewise empty, at the output of the converter. In the converter as described by Horowitz the starting current is limited only by the input voltage and the ON resistance of the MOSFET switches. Since the entirety of the input voltage is thus applied to the switching transistors a heavy peak current materializes which is a considerable load on the battery when the device is battery-powered. In addition to this the ohmic losses occurring in this case are considerable.

Corresponding conditions occur likewise when the converter is short-circuited at its output, i.e. when the output terminal of the converter is grounded, here too, the entirety of the input voltage being applied to the switching transistors.

The company Maxim Integrated Products describes in its product catalog available in May 1999 at site http://www.maxim-ic.com a converter corresponding to the aforementioned DC/DC converter with the product designation MAX679 which additionally includes a separate circuit for the starting phase and the short-circuit case of the converter, serving to reduce the current during the starting phase and when the output of the converter is short-circuited.

The salient element of this circuit is a timer with the aid of which a starting time is defined. On time-out of the starting time the current for charging the charge pump capacitor is directed through a separate switch, the circuit area of which corresponds to ⅒th of that of the four switching transistors of the charge pump. In actual practice, since the circuits are designed integrated, no additional switch is installed, but instead simply 10% only of the circuit area of the corresponding switching transistor is used during the starting phase. To charge the output capacitor an additional MOSFET switch, identified P4 in the document is made use of. In the starting phase this additional MOSFET connects the input of the converter to the output of the converter which connects the output capacitor.

However, the drawback of this circuit for the starting phase and the short-circuit case of the DC/DC converter is that it is relatively complicated and takes up a relatively large area of the circuit, it requiring a timer and an additionally "large" MOSFET which takes up a considerable proportion of the circuit "real estate", since it is via this switch that the current for charging the capacitor at the output of the circuit needs to flow in the starting phase. In addition, with this configuration neither the starting current nor the short-circuit current permits particularly good control since they are dictated only by the ON resistance of the additional MOSFET.

It is thus the object of the present invention to provide a DC/DC converter of the aforementioned kind having a circuit for the starting phase and the short-circuit case which is configured so as to obviate the drawbacks as cited above.

In accordance with one aspect of the invention this object is achieved by a DC/DC converter as cited at the outset characterized by a fifth MOSFET, the drain of which is connected to the input of the converter, its source being connected via a current source to ground and its gate to the source as well as being connectable via a first controllable switch to the gate of the third MOSFET, a second controllable switch connected to the gate of the second MOSFET and a third controllable switch connected to the gate of the fourth MOSFET and a comparator, the one input of which is connected to the output of the converter and the other input of which is connected to a reference voltage, the comparator outputting a first control signal to the controllable switches and to the control circuit when the output voltage is smaller than the reference voltage, by means of which the first controllable switch is signalled ON, the second and third controllable switch being actuated so that the second MOSFET and the fourth MOSFET are signalled ON and the charge pump is deactivated, and then when the output voltage is larger than the reference voltage, outputs a second control signal to the controllable switches and to the control circuit by means of which the first controllable switch is signalled OFF, the second and third controllable switch actuated so that the second MOSFET and the fourth MOSFET are signalled OFF and the charge pump activated.

The achievement in accordance with the invention suffices without an additional "large" switching transistor since now the current flowing in the starting phase for charging the two capacitors flows exclusively via the already available MOSFETs (second, third and fourth MOSFET) of the charge pump, thus requiring less circuit area than the solution hitherto as described above. In this arrangement the circuit area taken up by the additional controllable switches as well as by the fifth MOSFET is negligible since they are integrated to be substantially smaller than the MOSFETs handling the charging current, thus e.g. the circuit area of the fifth MOSFET in one embodiment of the DC/DC converter in accordance with the invention is only 1/1000th of the circuit area of the third MOSFET. In addition, in the DC/DC converter in accordance with the invention the current is precisely adjustable in both the starting phase and in the short-circuit case, this being achieved by a switchable current mirror formed by the third and fifth MOSFET when the first controllable switch connects the gates of the third and fifth MOSFET to each other by the comparator control signal. No complicated timer is needed by the achievement in accordance with the invention since selecting the starting phase and the normal charge pump mode is done by a simple comparator.

In one special embodiment of the DC/DC converter in accordance with the invention a sixth MOSFET is provided, the drain of which is connected to the source of the fifth MOSFET, its source being connected via a resistor to ground and its gate to the output of the converter to thus permit soft starting since the current is initially determined by the mirrored current of the current source connected to the fifth MOSFET, it then gradually increasing by the mirrored equivalent of the current flowing through the sixth MOSFET, thus resulting in less load on a battery furnishing the input voltage. In this embodiment in the short-circuit case the current is reduced with a reduction in the output voltage to thus achieve a special form of short-circuit protection also termed foldback effect.

In another special embodiment of the DC/DC converter in accordance with the invention the gate drivers of the first MOSFET and second MOSFET are supplied with the output voltage of the converter, resulting in the charge pump being signalled OFF even faster should a short-circuit occur.

The invention will now be explained by way of example with reference to the drawings in which.

Figure 1:
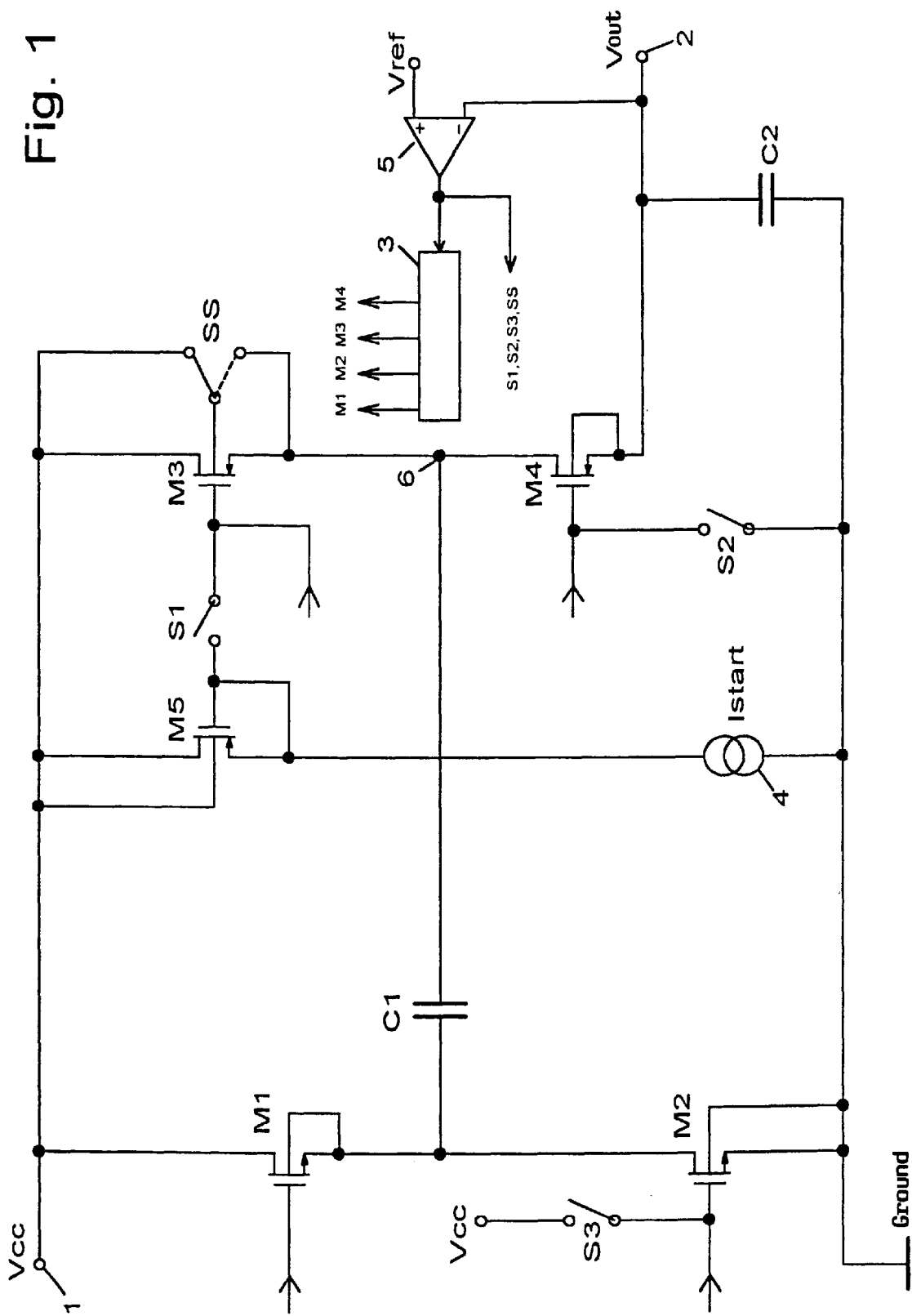
FIG. 1 is a circuit diagram of a first embodiment of the DC/DC converter in accordance with the invention.

Referring now to FIG. 1 there is illustrated the DC/DC converter in accordance with the invention configured preferably integrated and comprising a first capacitor C1, the one electrode of which is connectable via a first MOSFET M1 to the input 1 of the converter, to which an input DC voltage $V_{cc}$ is applied, and via a second MOSFET M2 to ground, and the other electrode of which is connectable via a third MOSFET M3 to the input of the converter 1 and via a fourth MOSFET M4 to the output 2 of the converter. The first MOSFET M1 and the second MOSFET M2 are of the n-channel type whilst the third MOSFET M3 and the fourth MOSFET M4 are of the p-channel type. All MOSFETs are depletion-type MOSFETs.

Connected between the output 2 of the circuit and ground is a second capacitor C2 for smoothing and storing the charge.

A control circuit 3 with an oscillator is connected to the gates of the four MOSFETs via driver circuits (not shown) as indicated in FIG. 1 by the arrows pointing in the direction of the gates of M1–M4 and the four arrows pointing away from control circuit symbol 3. The control circuit 3 controls the four MOSFETs in the charge pump mode. In the charge phase of the converter it signals the second MOSFET M2 and third MOSFET M3 ON and the first MOSFET M1 and the fourth MOSFET M4 OFF so that the capacitor C1 is charged to the input voltage $V_{cc}$. In the charge phase of the converter it signals the first MOSFET M1 and fourth MOSFET M4 ON and the second MOSFET M2 and the third MOSFET M3 OFF so that the input voltage $V_{cc}$ is connected in series with the capacitor, as a result of which the second capacitor C2 at the output of the circuit may be charged to a voltage corresponding roughly to twice the input voltage at the most. The DC/DC converter as described should comprise a regulator (not shown) which regulates the output voltage to a design value suitable for the application concerned at a level between the input voltage and twice the input voltage. One such regulator is described e.g. in the U.S. Pat. No. 5,680,300.

In the charge pump mode the oscillator of the control circuit 2 continually selects the four MOSFETs between the charge phase and discharge phase.

The further elements of the circuit are provided for the case of starting or short-circuiting the DC/DC converter.

Accordingly, a fifth MOSFET M5 of the p-channel type is provided, the drain of which is connected to the input of the converter. Via a current source 4 set to a special current the source of the fifth MOSFET M5 is connected to ground. The current source is achievable by known ways and means e.g. by a MOSFET or a current mirror. The gate of the fifth MOSFET M5 is connected to the source and connectable via a first controllable switch S1 to the gate of the third MOSFET M3. In this case M5 and M3 form a current mirror, the current flowing through the third MOSFET being dictated by the current source 4 and the circuit area ratio of the two transistors. In one preferred embodiment the circuit area of the fifth MOSFET is only 1/1000th of the circuit area of the MOSFET M3.

A second controllable switch S2 is connected between the gate of the fourth MOSFET M4 and ground and a third controllable switch S3 is connected between the input voltage $V_{cc}$ and the gate of the second MOSFET M2. The controllable switches S1, S2 and S3 may likewise consist of MOSFETs which, however, as compared to the four MOSFETs M1–M4 of the charge pump take up very little circuit area.

A further controllable switch SS is provided which serves to enable the substrate terminal of the third MOSFET M3 to select between the input voltage $V_{cc}$ and the source of the third MOSFET M3.

The DC/DC converter in accordance with the invention comprises in addition a comparator 5, to one input of which a reference voltage $V_{ref}$ is connected, selected so that it is below the input voltage $V_{cc}$ of the DC/DC converter by a certain amount. $V_{ref}$ may amount to e.g. $0.85*V_{cc}$. Connected to the other input of the comparator 5 is the output voltage $V_{out}$ of the converter. The output of the comparator is connected to the control circuit 2 and all controllable switches S1, S2, S3 and SS.

The way in which the DC/DC converter as shown in FIG. 1 works will now be explained with special reference to the starting phase of the converter.

The DC/DC converter as shown in FIG. 1 may be operated in two phases, a starting phase, during which the two capacitors C1, C2 are charged, and in a charge pump phase during which the converter operates in the normal charge pump mode as described above.

Selecting between the two phases is handled by the comparator 5 which monitors the output voltage $V_{out}$. When $V_{out} < V_{ref}$ then the converter is in the starting phase.

The comparator 5 then outputs a first control signal which in the selected example embodiment is an L-signal applied to the control circuit 3 and the control terminals (not shown) of the four controllable switches S1, S2, S3 and SS.

On receiving the first control signal the control circuit 3 deactivates the charge pump.

The three controllable switches S1, S2 and S3 are signalled ON on receiving the first control L-signal.

This results in the gates of the third MOSFET M3 and of the fifth MOSFET M5 being connected to each other by means of the second controllable switch S1 so that M3 and M5 form a current mirror. In the case of a current mirror the currents flowing through the MOSFETs of the current mirror are in the same ratio to each other as the area ratio of the two MOSFETs so that in this case the current flowing through the fifth MOSFET M5 amounts to 1/1000th of the current flowing through the third MOSFET M3.

In this arrangement the desired starting current is set via the current source 4 which furnishes a current $I_{start}$. This current flowing through the fifth MOSFET M5 is mirrowed by the factor 1000 onto the third MOSFET M3.

When the second controllable switch S2 is ON, the fourth MOSFET is ON resulting in a communicating current path "converter input 1 ($V_{cc}$), M3, M4, C2, ground" being formed for charging the second capacitor C2 and when the third controllable switch S3 is ON the fifth MOSFET M5 is ON resulting in a communicating current path "converter input 1 ($V_{cc}$), M3, C1, M2, ground" being formed for charging the first capacitor C1.

Since both the first capacitor C1 and the second capacitor C2 are charged via the third MOSFET M3, the charging current being split between the two capacitors, the current mirror M3, M5 in conjunction with the current source 4 enables the charging current to be precisely set to a desired level in both current branches in the starting phase.

Due to the control signal furnished by the comparator 5 the fourth controllable switch SS is also activated which connects the substrate of the third MOSFET M3 to the input voltage $V_{cc}$ of the DC/DC converter when the comparator signal is LOW to thus ensure that the diode formed between drain and source of this transistor is OFF whilst the capacitors are being charged.

At the end of the starting phase each of the two capacitors C1 and C2 is charged to a voltage of approx. $0.85*V_{cc}$.

When $V_{out} > V_{ref} = 0.85*V_{cc}$ the comparator outputs a second control signal which in the selected example is an H-signal which prompts the converter to change selection from the starting phase to the charge pump phase. This control signal opens the controllable switches S1, S2 and S3 so that the current mirror previously formed by M3 and M5 is deactivated and the second MOSFET M2 and fourth MOSFET M4 handed over to the control by the control circuit 3. On receiving the second control signal HIGH the control circuit 3 activates the charge pump so that now—as already described above—M2, M3 and M1, M4 are signalled ON alternatingly.

Due to the second control signal the fourth controllable switch SS is connected to the source of the third MOSFET M3, this being necessary since now the level of the voltage appearing at the circuit point 6 in the charge pump mode is above that of the input voltage $V_{cc}$ in the charge phase, it permitted to be approx. $2V_{cc}$ at the most. Due to the inverse voltage ratios the diode formed between drain-source of the third MOSFET M3 now needs to be poled in the opposite direction as compared to that of the starting phase so that any disturbing flow of current via the substrate of the third MOSFET M3 is prevented.

Short-circuiting the DC/DC converter at its output causes the voltage $V_{out}$ at its output 2 to drop below the reference voltage $V_{ref}$ so that the converter reselects the starting phase, reference being made accordingly to that already explained above as regards the further actions.

Figure 2:
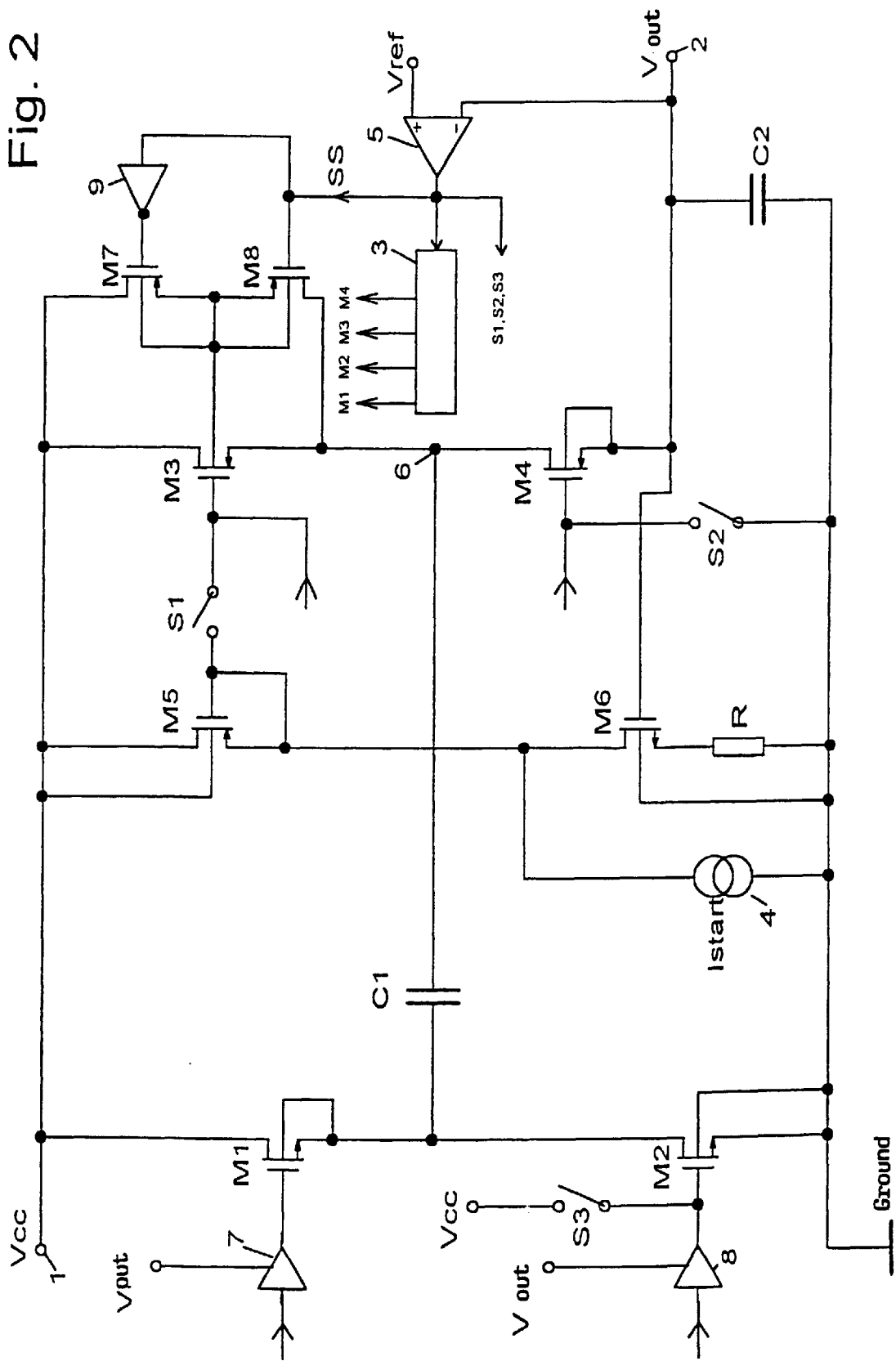
FIG. 2 is a circuit diagram of a further embodiment of the DC/DC converter in accordance with the invention.

Referring now to FIG. 2 there is illustrated a further embodiment of the DC/DC converter in accordance with the invention. Since the converter in accordance with this embodiment functions primarily the same as the converter as shown in FIG. 1 as already described, only the differences thereto will now be explained.

In this embodiment a sixth MOSFET M6 of the n-channel type is provided, the drain of which is connected to the source of the fifth MOSFET M5, its source being connected via a resistor R to ground and its gate to the output 2 of the converter.

Since the sixth MOSFET M6 is connected in parallel to the current source 4 it introduces in the starting phase an additional current I (M6) which in turn together with the $I_{start}$ is mirrowed on the third MOSFET M3 via MOSFET M5. Since the gate of the sixth MOSFET M6 is connected to the output voltage $V_{out}$ the additional current increases with increasing output voltage in accordance with the formula $$I(M6) = (V_{out} - V_{thr})/R$$

where $V_{thr}$ is the threshold voltage of the sixth MOSFET M6.

Figure 3:
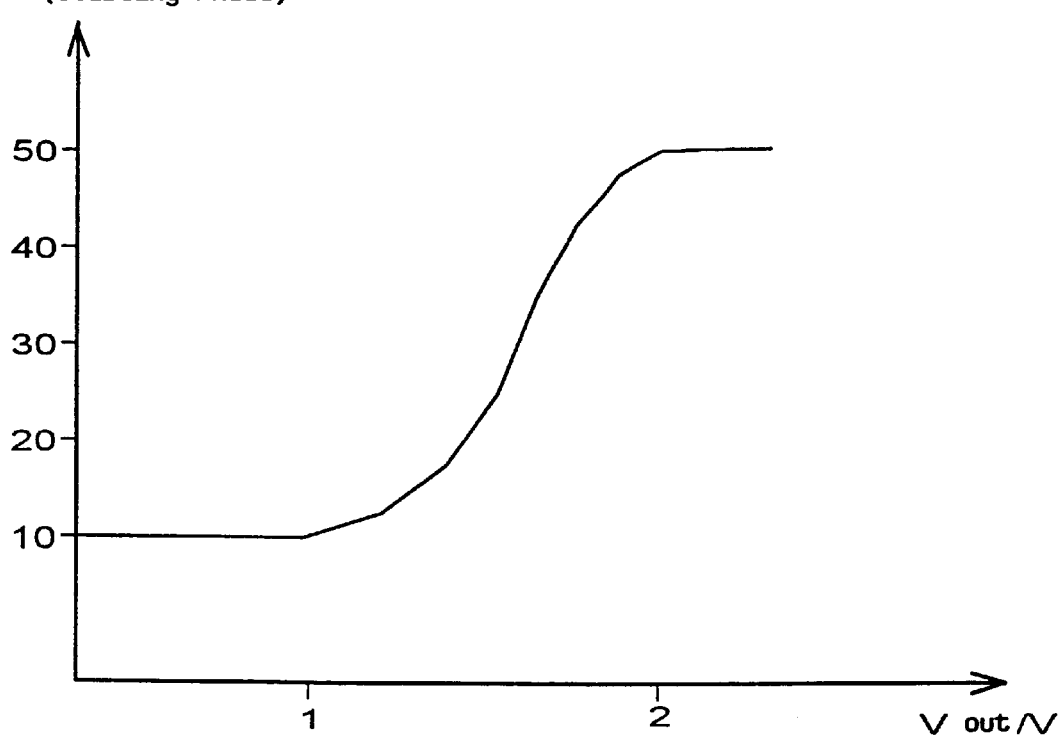
FIG. 3 is a graph plotting the current occurring in the starting phase of a DC/DC converter configured as shown in FIG. 2 as a function of the output voltage of the converter.

Referring now to FIG. 3 there is illustrated how the dependency between the capacitor charging current I and the output voltage $V_{out}$ may materialize in the starting phase as an example. On commencement of the starting phase the charging current I is determined solely by the current source 4 furnishing a predetermined constant current $I_{start}$, this current amounting to 10 mA in the selected example. When the second capacitor C2 is then gradually charged at the output of the converter the output voltage $V_{out}$ increases which in turn increases via the gate of the sixth MOSFET M6 the additional current I (M6) flowing through the latter. As a result of this the current for charging the capacitors C1 and C2 is also increased above the current mirror M3, M5, it gradually increasing to its final value of 50 mA, as evident from FIG. 3.

This soft increase in the starting current reduces the load on the battery furnishing the input voltage $V_{cc}$ as compared to that of a sharp increase in current. In addition to this the electromagnetic interference (EMI) is less in the case of a soft increase in the starting current than in a sudden increase thereof.

In the short-circuit situation of this embodiment the current decreases with a drop in the output voltage, resulting in a special form of short-circuit protection in which the strong increase in the dissipation loss otherwise accompanying the short-circuit is prominently missing. This is termed the foldback effect (actually a foldback of the output voltage/current characteristic with descreasing output voltage), the effect of which is adjustable by suitable selecting the resistor R. An explanation of this effect is given e.g. on page 963 of the German textbook Tietze/Schenk "Halbleiterschaltungs-technik", 11th Edition, Springer-Verlag Berlin Heidelberg 1999.

In addition, in the embodiment of the DC/DC converter in accordance with the invention as shown in FIG. 2 two of the gate drivers, namely gate drivers 7 and 8 of the first MOSFET 1 and second MOSFET respectively are supplied with the output voltage $V_{out}$. This has the advantage that the charge pump is instantly signalled OFF should a short-circuit occur at the output of the converter by one MOSFET in the charging path and one MOSFET in the discharge path of the charge pump being signalled OFF in each case; namely the OFF action as described above in conjunction with FIG. 2 by the control circuit 3 via the control signal of the comparator 5 output to the control circuit 3 is possible only with a certain transit time delay of a few microseconds, whereas instantly signalling the charge pump OFF enables the dissipation loss, resulting from the charge pump continuing to operate fleetingly during the short-circuit, to be reduced.

In conclusion, the embodiment as shown in FIG. 2 also features a special aspect of the fourth controllable switch SS. In this case the fourth switch comprises a first P-channel MOSFET M7 and a second P-channel MOSFET M8, the sources of which are connected to each other, whereby the drain of the first P-channel MOSFET M7 is connected to the input 1 of the converter and the drain of the second P-channel MOSFET M8 is connected to the source of the third MOSFET M3, the output of the comparator 5 is connected to the gate of the second P-channel MOSFET M8 and via an inverter 9 to the gate of the first P-channel MOSFET M7 and the substrate of the third MOSFET M3 is connected to the sources and substrates of the two P-channel MOSFETs M7, M8.

When the comparator 5 outputs an L-signal, the first P-channel MOSFET M7 receives at its gate via the inverter 9 an H-signal so that M7 is signalled ON, whilst the second P-channel MOSFET M8 receives an L-signal so that it remains OFF, as a result of which the substrate of the third MOSFET M3 is connected to the input voltage $V_{cc}$. When the comparator 4 then outputs an H-signal the first P-channel MOSFET M7 receives at its gate via the inverter 9 an LO-signal so that M7 is OFF whilst the second P-channel MOSFET M8 is ON, as a result of which the substrate of the third MOSFET M3 is connected to the source of the third MOSFET M3.

All in all it is again to be emphasized that as compared to the existing achievements the converter in accordance with the invention has a simpler configuration and suffices with less circuit area since the four MOSFETs (M1–M4) already existing in the charge pump simultaneously handle the task of conducting the charging current in the starting phase. All switches provided in addition thereto in the converter in accordance with the invention take up an additional circuit area which is negligable as compared to that of these MOSFETs.

What is claimed is:

1. A DC/DC converter operating on the principle of a charge pump, comprising a first capacitor, the one electrode of which is connectable via a first MOSFET to the input of the converter and via a second MOSFET to ground and the other electrode of which is connectable via a third MOSFET to the input of the converter and via a fourth MOSFET to the output of the converter, a second capacitor connected between the output of the converter and ground, and a control circuit with an oscillator connected to the gates of said four MOSFETs and serving with the charge pump active to signal said second and third MOSFET ON in the charge phase of the charge pump and said first and fourth MOSFET ON in the discharge phase of the charge PUMP a fifth MOSFET, the drain of which is connected to the input of the converter, its source being connected via a current source to ground and its gate to the source as well as being connectable via a first controllable switch to the gate of said third MOSFET, a second controllable switch connected to the gate of said second MOSFET and a third controllable switch connected to the gate of said fourth MOSFET and a comparator, the one input of which is connected to the output of the converter and the other input of which is connected to a reference voltage, said comparator outputting a first control signal to said controllable switches and to said control circuit when the output voltage is smaller than the reference voltage, by means of which said first controllable switch is signalled ON, said second and third controllable switch being actuated so that said second MOSFET and said fourth MOSFET are signalled ON and the charge pump is deactivated, and then when the output voltage is larger than the reference voltage, outputs a second control signal to said controllable switches and to said control circuit by means of which said first controllable switch is signalled OFF, said second and third controllable switch actuated so that said second MOSFET and said fourth MOSFET are signalled OFF and the charge pump activated.

2. The DC/DC converter as set forth in claim 1 wherein a sixth MOSFET is provided, the drain of which is connected to the source of said fifth MOSFET, its source being connected via a resistor to ground and its gate to the output of the converter.

3. The DC/DC converter as set forth in claim 1 wherein said first MOSFET and said second MOSFET comprise gate drivers which are supplied with the output voltage of the converter.

4. The DC/DC converter as set forth in claim 1 wherein the DC/DC converter is produced as an integrated circuit.

5. The DC/DC converter as set forth in claim 1 wherein all MOSFETs are depletion-type MOSFETS, said first MOSFET, second MOSFET and sixth MOSFET are N-channel MOSFETs, the remaining MOSFETS being P-channel MOSFETS, and wherein said second controllable switch is connected between the gate of said fourth MOSFET and ground and said third controllable switch is connected between the gate of said second MOSFET and the input voltage of the converter.

6. The DC/DC converter as set forth in claim 5 comprising a fourth switch controllable by said comparator, this switch connecting the substrate of said third MOSFET to the input of the converter when said comparator outputs said first control signal and connecting the substrate of said third MOSFET to the source of said third MOSFET when said comparator outputs said second control signal.

7. The DC/DC converter as set forth in claim 6 wherein said fourth switch comprises a first P-channel MOSFET and a second P-channel MOSFET, the sources of which are connected to each other, whereby the drain of said first P-channel MOSFET is connected to the input of the converter and the drain of said second P-channel MOSFET is connected to the source of said third MOSFET, the output of said comparator is connected to the gate of said second P-channel MOSFET and via an inverter to the gate of said first P-channel MOSFET and the substrate of said third MOSFET is connected to the sources and substrates of said two P-channel MOSFETs.

8. The DC/DC converter as set forth in claim 1 wherein said first controllable switch, said second controllable switch and said third controllable switch are MOSFETS.

9. The DC/DC converter as set forth in claim 4 wherein the circuit area taken up by the each of said first, second, third and fourth MOSFETs is large as compared to that taken up by the other MOSFETS.

10. The DC/DC converter as set forth in claim 9 wherein said fifth MOSFET is smaller than said third MOSFET by a factor of 1000.

11. The DC/DC converter as set forth in claim 1 wherein the reference voltage is smaller than the input voltage of the DC/DC converter.

12. The DC/DC converter as set forth in claim 2 wherein said first MOSFET and said second MOSFET comprise gate drivers which are supplied with the output voltage of the converter.

13. The DC/DC converter as set forth in claim 2 wherein all MOSFETs are depletion-type MOSFETS, said first MOSFET, second MOSFET and sixth MOSFET are N-channel MOSFETs the remaining MOSFETS being P-channel MOSFETS, and wherein said second controllable switch is connected between the gate of said fourth MOSFET and ground and said third controllable switch is connected between the gate of said second MOSFET and the input voltage of the converter.

14. The DC/DC converter as set forth in claim 3 wherein all MOSFETs are depletion-type MOSFETS, said first MOSFET, second MOSFET and sixth MOSFET are N-channel MOSFETs the remaining MOSFETS P-channel MOSFETS, and wherein said second controllable switch is connected between the gate of said fourth MOSFET and ground and said third controllable switch is connected between the gate of said second MOSFET and the input voltage of the converter.

15. The DC/DC converter as set forth in claim 2 wherein said first controllable switch, said second controllable switch and said third controllable switch are MOSFETS.

16. The DC/DC converter as set forth in claim 3 wherein said first controllable switch, said second controllable switch and said third controllable switch are MOSFETS.

17. The DC/DC converter as set forth in claim 5 wherein said first controllable switch, said second controllable switch and said third controllable switch are MOSFETS.

18. The DC/DC converter as set forth in claim 8 wherein the circuit area taken up by the each of said first, second, third and fourth MOSFETs is large as compared to that taken up by the other MOSFETS.

19. The DC/DC converter as set forth in claim 2 wherein the reference voltage is smaller than the input voltage of the DC/DC converter.

20. The DC/DC converter as set forth in claim 3 wherein the reference voltage is smaller than the input voltage of the DC/DC converter.

* * * * *